United States Patent

[11] 3,559,596

| [72] | Inventors | Kazuo Ishii;<br>Mutsuo Koizumi, Tokyo, Japan |
|---|---|---|
| [21] | Appl. No. | 808,140 |
| [22] | Filed | Mar. 18, 1969 |
| [45] | Patented | Feb. 2, 1971 |
| [73] | Assignee | Kurita Water Industries Ltd.<br>Osaka-shi, Japan<br>a corporation of Japan |
| [32] | Priority | Mar. 23, 1968 |
| [33] | | Japan |
| [31] | | 43/18808/68 |

[54] METHOD AND APPARATUS FOR INCINERATING SLUDGE
10 Claims, 2 Drawing Figs.

[52] U.S. Cl. .......................... 110/7, 110/15
[51] Int. Cl. .......................... F23g 5/04
[50] Field of Search .......................... 110/7, 8, 15, 18

[56] References Cited
UNITED STATES PATENTS

| 2,191,712 | 2/1940 | Greenawalt | 110/7 |
| 3,319,586 | 5/1967 | Albertson et al. | 110/8 |
| 3,304,894 | 2/1967 | Cox et al. | 110/15 |
| 3,357,375 | 12/1967 | Brophy | 110/7 |

*Primary Examiner*—Kenneth W. Sprague
*Attorney*—Woodhans, Blanchard and Flynn

ABSTRACT: A method of incinerating sludge which comprises the steps of subjecting watery organic sludge to pressure and heating concurrently and then jetting the thus treated sludge into a combustion chamber so as to evaporate most of the water contained in the sludge instantaneously with said jetting and incinerating the resultant solid matters within the combustion chamber, said chamber being provided with a packed layer of refractories designed to catch said solid matters, and an apparatus pertaining thereto.

PATENTED FEB 2 1971

3,559,596

INVENTOR
KAZUO ISHII
MUTSUO KOIZUMI

BY Woodhams, Blanchard & Flynn
ATTORNEY

3,559,596

METHOD AND APPARATUS FOR INCINERATING SLUDGE

BACKGROUND OF THE INVENTION

1. Field of the Invention

The present invention relates to an improved method and an apparatus relevant thereto intended for enhancing the efficiency of incineration of watery sludge which is inevitably turned out in large quantities from waste treatment plants.

2. Description of the Prior Art

At places where there are provided facilities for domestic and/or industrial waste treatment, a voluminous outflow of sludge containing a high percentage of water is inevitable and it is a nuisance to change said sludge into an easily disposable substance through further treatment. For instance, activated sludge and digested sludge are rather difficult to filter or dehydrate so that even after they are subjected to treatment with a dewatering filter, they cannot be sufficiently dewatered and they still contain ordinarily about 80 percent of water therein.

The constituents of the sludge thus treated for dewatering are substantially organic matters, so that it has heretofore been proposed to dispose of them by means of incineration. However, the incineration methods in the prior art have been designed to feed said sludge directly to an incinerator, and consequently, it has been difficult to burn it efficiently due to the large quantity of water still contained therein.

SUMMARY OF THE INVENTION

The present invention is intended to provide a method for incinerating efficiently a sludge containing a large quantity of water as set forth above for the purpose of disposal thereof, said method being featured by the fact that the sludge is first subjected to pressure and heating and then it is jetted into a combustion chamber to thereby evaporate most of the water contained in the sludge instantaneously with said jetting and the resultant solid matters are incinerated completely.

According to the present invention, when sludge heated up to more than 100°C. under 1—5 $kg/cm^2$ gauge of pressure is jetted into a combustion chamber having a low pressure, most of the water content thereof is vaporized instantaneously by virtue of the sudden drop in pressure within the chamber, whereby the solid matter of the sludge is separated in an almost dried state. In such a state combustion is caused within the chamber by means of feeding air which has been heated preliminarily, and the floating dried fine particles of solid matter are reduced to ashes.

At the beginning of the incineration of the sludge, it is necessary that some supplementary fuel be fed, but once incineration has started, it continues by itself on account of the heat produced by burning of the sludge per se. However, there may be some cases where such spontaneous incineration is hampered by the nature of the components of the sludge or the water content thereof. In such an event, some supplementary fuel may be fed into the combustion chamber or a specific fuellike heavy oil may be preliminarily mixed with the sludge to be fed for incineration to cope with said trouble.

As for the means of preliminarily heating the sludge, it will be satisfactory either to heat the sludge by utilizing the waste gas resulting from the incineration of the sludge by installing the sludge feed pipe inside the flue (viz. smoke duct) or to install the sludge feed pipe inside the combustion chamber so as to heat sludge within said pipe by utilizing the combustion gas and to subject the sludge to pressure by means of the steam pressure resulting therefrom.

Moreover, the efficiency of combustion can be further enhanced by installing a packed bed of refractory objects inside the combustion chamber so as to catch the solid matter contained in the sludge with said packed bed to thereby facilitate said incineration. To be more precise, when a combustion chamber is provided therein with a packed bed of a plurality of refractory objects such as carborundum and chiamotte and sludge is jetted onto said packed bed, the nearly dried solid matter adheres to the refractory bed and is reduced to ashes, said ashes then falling down in smelted state. In other words, by installing a packed bed of refractories inside a combustion chamber, the velocity of the air current on the surfaces of said refractory objects is increased, and fine particles of solid matter which adhere to the surfaces of the refractory objects cause a high relative velocity between the solid matter and the current of heated air being fed into the combustion chamber and the solid matter is rapidly incinerated.

The combustion temperature is regulated to be higher than the smelting temperature of the ashes, and the surface of the refractories is covered with smelted ashes (a melt of ashes), said melt of ashes facilitating catching of fine particles of solid matter. The smelted ashes fall down successively to collect at the bottom of the combustion chamber, and they are discharged therefrom.

According to the foregoing method for incineration of sludge, most of the water content of the sludge is instantaneously evaporated with the jetting. Moreover, the somewhat watery sludge is dispersed to adhere to the surface of the packed bed of refractories heated by burning of fuel and the process from dehydration through incineration are integratedly performed at said surface of the bed. As a result, the time required for evaporating the water content therefrom can be reduced and the efficiency of combustion can be enhanced. As the smelting temperature of ashes resulting from incineration of sludge is relatively low, it is possible to smelt them by maintaining the temperature of said packed bed of refractories at 1,400° C. or thereabout. A temperature of this value involves no risk of a packed layer of ordinary refractories becoming softened or corroded by ashes. Besides, for the same reason as set forth above, the combustion temperature required for continuous incineration as well as simultaneous smelting of ashes is not high, so that there is not much requirement for supplementary fuel, either.

BRIEF DESCRIPTION OF THE DRAWING

In the accompanying drawings.

DESCRIPTION OF THE PREFERRED EMBODIMENTS

Figure 1:
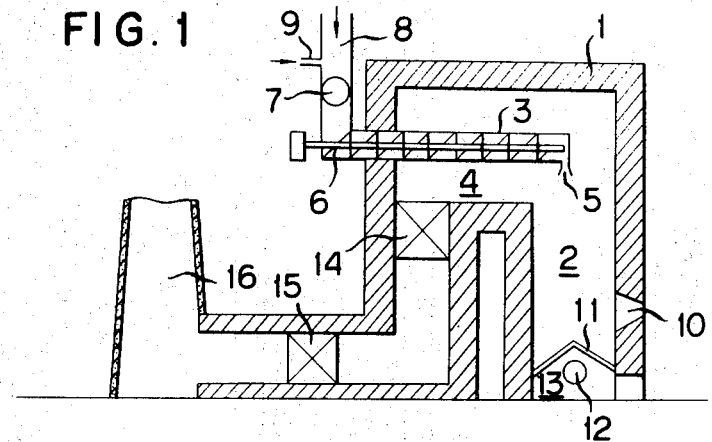
FIG. 1 is a cross-sectional view of an apparatus for incinerating sludge for the purpose of illustrating the method of incinerating sludge according to the present invention.

In FIG. 1, 1 denotes an incinerator, 2 denotes a combustion chamber, and 3 denotes a sludge-heating duct, respectively. The incinerator 1 is provided with a combustion chamber 2 installed inside thereof and said chamber is designed to effect combustion of sludge by applying a pressure which approximates atmospheric pressure. The sludge-heating duct 3 penetrates a sidewall of the incinerator 1, passes through the flue 4, and its inner end is equipped with the nozzle 5 which opens at the upper part of the combustion chamber 2. The sludge-heating duct 3 comprises a heat transmission duct, said duct being equipped with the screw feeder 6 therein. The sludge-heating duct 3 is connected with the sludge-feeding duct 8 and a heavy-oil-feeding duct 9 through the medium of the pressure feeder 7. Further, in FIG. 1, 10 denotes an auxiliary fuel oil burner nozzle, 11 denotes a grate, 12 denotes a combustion air inlet, 13 denotes an ash pit, 14 denotes an air preheater, 15 denotes a dust catcher, and 16 denotes a chimney stack, respectively. Sludge is fed to the sludge-heating duct 3 from the sludge-feeding duct 8 through the medium of the pressure feeder 7. At this juncture, heavy oil is fed through the heavy-oil-feeding duct 9 to be mixed with sludge as required. The sludge-heating duct 3 opens into the exterior only through the nozzle 5 on the inner end thereof and also is installed inside the flue 4 which permits the passage of combustion gas, so that the sludge may be heated to cause the pressure therein to increase. For the sake of preventing adhesion of scale onto the interior of the sludge-heating duct 3 as well as stirring of sludge and smoothing the movement thereof, the screw feeder 6 is driven, whereby effecting a uniform heating of sludge. According to the present method, when sludge is heated to preferably 120°—150° C. and to a pressure of 1—5 kg/cm² gauge within said duct 3 and thereafter is jetted through the nozzle 5 into the combustion chamber 2, the sudden decrease in pressure within said chamber 2 causes most of the water of the sludge to vaporize instantaneously and flow into the flue 4 together with the combustion gas, while solid matter contained in said sludge falls down a dried state and burns while suspended in the gas stream.

In order to begin the combustion, supplementary fuel is burnt for ignition purposes by means of the auxiliary burner 10. Once combustion has started, the necessity of further employing said supplementary fuel depends on the nature or quality of sludge to be incinerated, but, in practice, it may be concurrently employed for the purpose of expediting combustion. Combustion is effected by feeding air preliminarily heated with the air preheater 14 into the incinerator from the combustion air inlet 12 by way of a duct which is not shown in the present FIG. In this operation, unburnt sludge containing carbon residue of a relatively large quantity accumulates on the grate 11 and then is reduced to ashes by the blast of heated air and descends into the ash pit 13. Combustion gas with a high temperature generated in the combustion chamber 2 is discharged into the atmosphere through the air preheater 14, dust catcher 15, and chimney stack 16 in order, after it has imparted its heat to the sludge by means of the sludge heating duct 3.

Detection of the internal pressure is conducted with regard to appropriate parts of sludge-heating duct 3, and, based on the resultant data, the drive of the pressure feeder 7 is suspended so as to regularize the internal pressure of the sludge-heating duct 3. When the internal pressure of said sludge-heating duct has been set to be 1 kg/cm² gauge, the water content of the sludge readily turns into vapor when the temperature of sludge exceeds 120°C. And, in case heavy oil is mixed with the sludge to be fed, movement of the sludge becomes smooth, efficient separation of water content from the sludge is brought about, and the combustion of sludge is expedited.

In addition to the specific characteristics of the present invention as elucidated in the foregoing, the method according to the present invention, when compared with conventional methods of incineration in the prior art wherein the preheating process has not been adopted, has such advantages as are described in the following.

According to those methods in the prior art, a considerably long period of time and a large space have been required for drying sludge as a preliminary process for making the sludge combustible, whereas such requirements are unnecessary for the method under the present invention. Besides, those conventional methods had such drawbacks that, the water content of sludge placed in the combustion zone was still comparatively high, the combustibility of the sludge thereat was unstable and it was difficult to maintain a satisfactory combustion thereof. On the contrary, the sludge treated by the method of the present invention contains just a small quantity of residual water and is homogeneous, so that it is provided with conditions quite suitable for ignition and it is easily maintained in the state for satisfactory combustion. Furthermore, the method of the present invention has the feature that, at the juncture of jetting the sludge from the jet nozzle into the combustion chamber, the spray performance is accelerated by virtue of the pressure of the vapor, and thereby the efficiency of combustion is enhanced.

Figure 2:
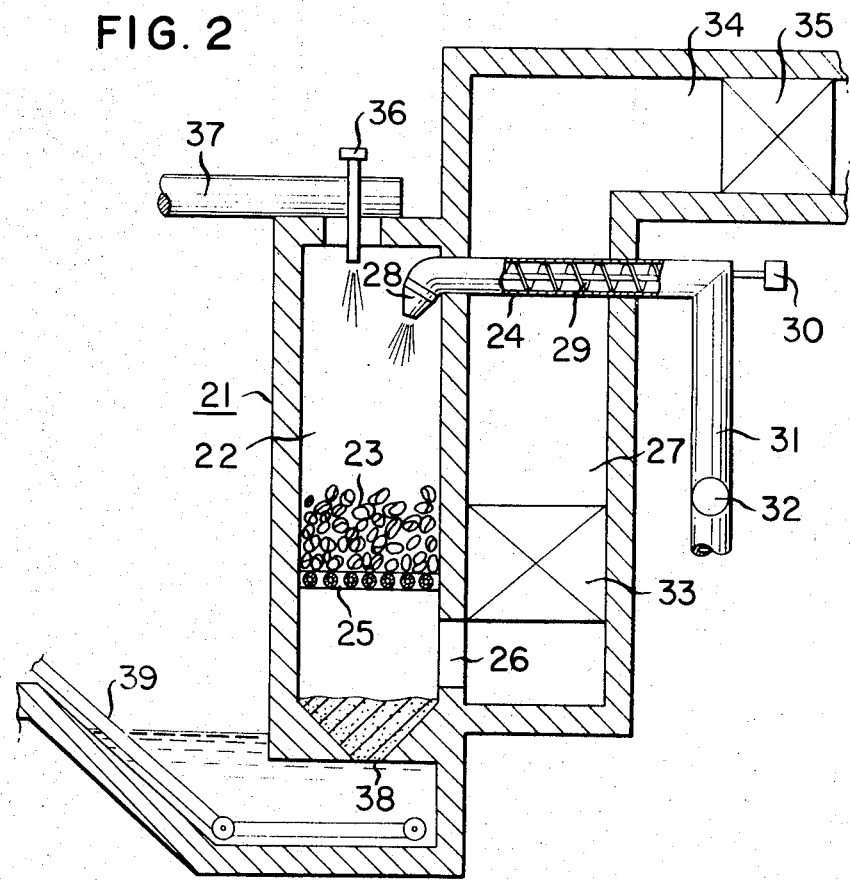
FIG. 2 is a cross-sectional view of another embodiment of apparatus embodying the present invention in which the combustion chamber is provided with a packed bed consisting of refractories.

FIG. 2 illustrates an apparatus designed for use in incinerating sludge, said apparatus comprising a combustion chamber which is equipped with a packed bed consisting of refractories. Of the reference numerals in the drawing, 21 denotes the incinerator, 22 denotes a combustion chamber, 23 denotes a packed bed of refractory objects, and 24 denotes a sludge heating duct, respectively. Inside the incinerator 21, there is installed the combustion chamber 22 whose internal pressure is so maintained as to approximate atmospheric pressure, and said combustion chamber 22 is equipped with a packed bed of refractory objects 23 therein.

The packed bed of refractories 23 is installed in the middle of the combustion chamber 22 by employing the water-cooled grate 25, and the part beneath the packed bed of refractories 23 opens into the neighboring exhaust chamber 27 by way of the interconnecting opening 26.

The sludge-heating duct 24 penetrates the exhaust chamber 27, and its end is equipped with a nozzle 28 and opens above the packed bed of refractories 23. Within the sludge heating duct 24, there is provided a screw feeder 29 which is driven by means of a motor 30. 31 denotes a sludge-feeding duct, 32 denotes a pressure feeder, 33 denotes an air preheater, 34 denotes a flue, and 35 denotes a dust catcher, respectively. An auxiliary burner 36 is provided in the upper part of the combustion chamber 22, said chamber being also connected with a combustion air inlet 37.

The bottom of combustion chamber 22 is provided with a smelted ashes outlet 38 and is kept in a water-sealed condition, and a conveyor 19 is provided therebelow.

Air is fed through the combustion air inlet 37 and causes the fuel to burn by way of the auxiliary burner, whereby the packed bed with refractories 23 is heated and at the same time the sludge within the sludge-heating duct 24 is also heated. For the duration of combustion, air heated preliminarily by means of the air preheater 33 is supplied from the combustion air inlet 37 by way of a specific tube which is not shown in the present drawing. Sludge is fed by means of the pressure feeder 32 from the sludge-feeding duct 31 to the sludge-heating duct 24. Since said sludge-heating duct is designed to open into only the combustion chamber 22 at the position of the nozzle 28 fixed to the end of the duct and also is installed within the exhaust chamber 27 wherethrough the combustion gas passes, its internal pressure increases as it is heated. For the sake of preventing adhesion of scale onto the interior of the sludge heating duct 24 as well as rabbling of sludge and smoothing the movement thereof, the screw feeder 29 is driven, thereby effecting a uniform heating of the sludge. According to the present method, when the packed bed of refractories is heated up to about 1,400° C. and sludge is heated to preferably a pressure of 1—5 kg./cm.2G and a temperature of 120°—150° C. within the sludge-heating duct 24 and thereafter jetted through the nozzle 28 onto said packed bed of refractories 23 of the combustion chamber 22, a sudden decrease in pressure within said chamber 22 causes most water of sludge to vaporize instantaneously and flow into the flue 34 together with combustion gas, while solid matter contained in said sludge descends in a dried and pulverized state and adheres to said packed bed 23 to burn. The combustion gas flows into the exhaust chamber 27 through the interconnecting opening 26, contributes some of its heat while passing through the air preheater 33 and the sludge heating duct 24, enters the flue 34 to get rid of ash by means of the dust catcher 35, and is exhausted thereafter. The ashes drip in a smelted state onto the conveyor 39 through the outlet 38 and are discharged.

Detection of the internal pressure is conducted with regard to appropriate parts of sludge-heating duct 24, and, based on the resultant data, the drive of the pressure feeder 7 is suspended so as to regularize the internal pressure of the sludge-heating duct 24. When the internal pressure of said sludge-heating tube has been set to be 1 kg./cm.2G., the water content of sludge readily turns into vapor when the temperature of sludge exceeds 120°C. And, when heavy oil is mixed with sludge to be fed, the movement of sludge becomes smooth, efficient separation of water content from the sludge is brought about, and combustion of sludge is expedited.

In addition to the specific features of the present invention as elucidated in the foregoing, the method according to the present invention which is also noteworthy in that combustion is effected by causing the sludge to adhere onto a packed bed of refractories has the advantages as described below, when compared with conventional methods for incineration wherein the preheating process is not used.

In the present method, sludge is jetted in a pressurized and heated state, so that most of the water contained in the sludge turns into vapor instantaneously and the solid matter of the sludge is readily separated as dried fine particles.

Contrary to the conventional methods which have required a huge combustion chamber because of considerable length of time necessary for the dehydration of the sludge, the combustion chamber according to the present invention can be of quite small size on account of its improved efficiency of combustion.

According to the present method wherein combustion is effected by means of a packed bed of refractories and smelting the ashes, the load factor at the time when said ashes pass through the gaps of the refractories is so high that even an apparatus of small scale works effectively.

The ashes resulting from the combustion are so thoroughly smelted that very few are allowed to fly out of the incinerator, and consequently, the present method contributes to prevention of air pollution.

Moreover, as the ashes flow out in a smelted state, they are convenient for use in manufacturing secondary products therefrom (such as blocks or framework materials).

EXAMPLE 1

Incineration was conducted by means of an apparatus as shown in FIG. 1 while feeding thereto, at the rate of 50 kg./hr., sludge turned out by waste treatment, said sludge containing water, averaging 80 percent thereof, together with solid matters comprising combustibles to the extent of 50 percent thereof. In this case, heavy oil was concurrently fed at the rate of 0.46 l./hr. The internal pressure of the sludge heating duct was maintained at 1 kg./cm.2G, and the sludge therein was heated up to 120°C. Subsequently, the sludge thus treated was jetted through the nozzle into the combustion chamber to effect the incineration. By means of the auxiliary burner, light oil was burnt at the rate of 1.5 l./hr., while air preheated at 100°—200°C. was sent into combustion chamber by way of the combustion air inlet, whereby the internal temperature was maintained at 800°C. to effect combustion. The heat load within the combustion chamber was 130,000 Kcal./m.3hr. and the excess air factor therein was 1.2, and thus the combustion of sludge was performed satisfactorily.

EXAMPLE 2

Incineration was conducted by means of an apparatus as shown in FIG. 2 while feeding thereto at the rate of 100—150 kg./hr., sludge turned out by waste treatment, said sludge containing water, averaging 75—80 percent thereof, together with solid matters comprising combustibles to the extent of 50 percent thereof. In this case, combustion was performed by setting the nozzle jet pressure in the range of 0.2—0.7/cm.$^2$, gauge and nozzle jet temperature in the range of 103°—111°C. Besides, by means of the auxiliary burner, light oil was burnt at the rate of 10—20 l./hr. As for the packed bed of refractories, carborundum with a grain size of 3—5cm. was employed to form a bed of 0.2m. thick. The grate was 0.09m.$^2$ in area. The heat release efficiency of the packed bed with refractories was $1.2-2.0 \times 10^7$ Kcal./m.$^2$hr., the heat release efficiency per unit area of grate was $3.0-5.0 \times 10^6$ Kcal./m.$^2$hr., the maximum temperature of packed bed with refractories was 1,500° C., and the quantity of flying ash was 1—2 g./m.$^3$.

We claim:

1. A method of incinerating a sludge containing a large amount of water, in an apparatus which comprises a combustion chamber and a sludge-feeding and preheating device extending into the combustion chamber, said device having an internal rotatable agitator therein, the method comprising the steps of forwarding the sludge through said device and simultaneously rotating said agitator to agitate the entirety of the sludge in said device and also simultaneously preheating said sludge in said device to a temperature above 100° C. so that the sludge in said device is under a superatmospheric pressure and is continuously agitated, injecting the sludge from the discharge end of said device downwardly into the combustion chamber, said combustion chamber being substantially at atmospheric pressure, whereby the major portion of the water in said sludge will be vaporized substantially instantaneously and the resulting water vapor will effect substantially uniform dispersion of the solid components of the sludge in the combustion chamber, and supplying combustion air into said combustion chamber for incinerating the burnable solid components of the sludge under substantially atmospheric pressure as the solid components fall downwardly in said combustion chamber.

2. A method of incinerating sludge as defined in claim 1, in which the combustion chamber contains a stationary packed bed of refractory objects so that the solid components of the sludge are caused to fall onto said packed bed of refractories and are incinerated thereon.

3. A method of incinerating sludge as defined in claim 1, wherein the sludge in said device is preheated by the gaseous products of combustion which flow from the combustion chamber around said device.

4. A method according to claim 1, in which the sludge in the preheating and feeding device is under a pressure in the range of 1—5 kg./cm.$^2$ gauge.

5. A method according to claim 1, in which the combustion air flows upwardly through the combustion chamber countercurrent to the downwardly falling sludge, the gaseous products of combustion flow upwardly out of the combustion chamber and then pass around said device in order to preheat the sludge therein.

6. A method according to claim 1, in which the sludge is projected into the combustion chamber above a stationary bed of refractory objects so as to move downwardly therethrough, the combustion air flows downwardly through the combustion chamber and said bed concurrently with said sludge, removing the gaseous products of combustion from the lower end of said combustion chamber below said bed and then flowing said gaseous products of combustion around said device in a zone which is outside of the combustion chamber.

7. An apparatus for incinerating sludge, comprising:
   means defining a combustion chamber;
   a burner communicating with the combustion chamber for effecting heating thereof;
   a combustion air inlet communicating with the combustion chamber;
   an outlet for ashes at the bottom of the combustion chamber;
   means defining an exhaust chamber communicating with said combustion chamber and adapted for receiving gaseous products of combustion from said combustion chamber;
   an air preheater disposed in said exhaust chamber;
   a packed bed of refractory objects disposed within the combustion chamber; and
   a sludge-heating conduit having a screw feeder therein, said conduit extending through said exhaust chamber and projecting into the combustion chamber.

8. An apparatus according to claim 7, in which said sludge-heating conduit, said burner and said combustion air inlet communicate with said combustion chamber above said packed bed of refractory objects and said exhaust chamber communicates with said combustion chamber below said bed.

9. An apparatus for incinerating sludge, comprising:
   means defining a combustion chamber;
   a burner communicating with the combustion chamber for effecting heating thereof;

an outlet for ashes at the bottom of the combustion chamber;

means defining a combustion gas exhaust chamber communicating with said combustion chamber; and a sludge-heating conduit having a screw feeder therein, said conduit extending through said exhaust chamber and opening into the combustion chamber for feeding heated sludge into said combustion chamber.

10. An apparatus according to claim 9, in which the combustion air inlet is disposed in the bottom of the combustion chamber and the exhaust chamber communicates with and extends away from the upper end of the combustion chamber.

UNITED STATES PATENT OFFICE
CERTIFICATE OF CORRECTION

Patent No. 3 559 596          Dated February 2, 1971

Inventor(s) Kazuo Ishii and Mutsuo Koizumi

It is certified that error appears in the above-identified patent and that said Letters Patent are hereby corrected as shown below:

Column 7, before line 1; insert ---a combustion air inlet communicating with the combustion chamber;---.

Signed and sealed this 22nd day of June 1971.

(SEAL)
Attest:

EDWARD M. FLETCHER, JR.          WILLIAM E. SCHUYLER, JR.
Attesting Officer                  Commissioner of Patents